(12) United States Patent
Annawald et al.

(10) Patent No.: US 8,777,303 B2
(45) Date of Patent: Jul. 15, 2014

(54) SHADING SYSTEM AND METHOD FOR ASSEMBLING A SHADING SYSTEM

(71) Applicant: GM Global Technology Operations LLC, Detroit, MI (US)

(72) Inventors: Frank Annawald, Ruesselsheim (DE); Holger Thums, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/624,034

(22) Filed: Sep. 21, 2012

(65) Prior Publication Data

US 2013/0082485 A1    Apr. 4, 2013

(30) Foreign Application Priority Data

Sep. 26, 2011    (DE) .......................... 10 2011 114 282

(51) Int. Cl.
*B60J 7/00*    (2006.01)

(52) U.S. Cl.
USPC .......................................................... 296/215

(58) Field of Classification Search
USPC .......................................................... 296/215
See application file for complete search history.

(56) References Cited

U.S. PATENT DOCUMENTS

| | | | |
|---|---|---|---|
| 6,493,915 B2 * | 12/2002 | Zonneveld et al. | 29/401.1 |
| 6,865,795 B2 * | 3/2005 | Hernandez et al. | 29/469 |
| 6,979,042 B2 * | 12/2005 | Kawasaki | 296/97.8 |
| 7,077,462 B1 * | 7/2006 | De Gaillard | 296/216.01 |
| 7,387,329 B2 * | 6/2008 | Mollick et al. | 296/97.8 |
| 7,431,386 B2 * | 10/2008 | Schoenauer et al. | 296/215 |
| 7,900,991 B2 * | 3/2011 | Fallis et al. | 296/107.01 |
| 7,922,239 B2 * | 4/2011 | Mathes et al. | 296/210 |
| 8,007,023 B2 | 8/2011 | Glaser | |
| 8,256,492 B2 * | 9/2012 | Lin | 160/370.22 |
| 2012/0180961 A1 * | 7/2012 | Lin | 160/370.22 |

FOREIGN PATENT DOCUMENTS

| | | |
|---|---|---|
| DE | 4320393 A1 | 12/1994 |
| DE | 202006009738 U1 | 9/2006 |
| DE | 102005055812 A1 | 5/2007 |
| EP | 1987973 A1 | 11/2008 |

* cited by examiner

*Primary Examiner* — Lori Lyjak (74) *Attorney, Agent, or Firm* — Ingrassia Fisher & Lorenz, P.C.

(57) ABSTRACT

A shading system is provided, such as an overhead shading system for a panoramic window of a motor vehicle, which includes, but is not limited to a holding frame for attachment to a motor vehicle body. The holding frame exhibits a cross member, a first longitudinal member joined with the cross member, and a second longitudinal member joined with the cross member, a transverse strip guided so that it can slide from the first longitudinal member and second longitudinal member in order to activate a shading device coupled with the cross member and transverse strip, such as a roller blind or window shade, for at least partially covering a window opening bordered by the holding frame and transverse strip, and a guide connected with the holding frame, in particular a guiding rope.

18 Claims, 5 Drawing Sheets

SHADING SYSTEM AND METHOD FOR ASSEMBLING A SHADING SYSTEM

CROSS-REFERENCE TO RELATED APPLICATION

This application claims priority to German Patent Application No. 10 2011 114 282.0, filed Sep. 26, 2011, which is incorporated herein by reference in its entirety.

TECHNICAL FIELD

The technical field relates to a shading system and a method for assembling a shading system, which can be used in particular to shade the passenger compartment of a motor vehicle.

BACKGROUND

Document DE 10 2008 020 542 A1 describes a shading system for a motor vehicle, in which a shading device designed as a roller blind can be shifted between two parallel longitudinal members of a holding frame. There is a need for simplifying the activation of a shading system.

Therefore, at least one object is to indicate measures that enable an easy activation of a shading system. In addition, other objects, desirable features and characteristics will become apparent from the subsequent summary and detailed description, and the appended claims, taken in conjunction with the accompanying drawings and this background.

SUMMARY

An embodiment relates to a shading system, in particular an overhead shading system for the panoramic window of a motor vehicle, encompassing a holding frame for attachment to a motor vehicle body. The holding frame exhibits a cross member, a first longitudinal member joined with the cross member, and a second longitudinal member joined with the cross member, a transverse strip guided so that it can slide from the first longitudinal member and second longitudinal member in order to activate a shading device coupled with the cross member and transverse strip, in particular a roller blind or window shade, for at least partially covering a window opening bordered by the holding frame and transverse strip and at least one guide connected with the holding frame, in particular a guiding rope. The transverse strip exhibits a tilting safeguard that can be propped against the guide so as to guide the transverse strip parallel relative to the first longitudinal member and second longitudinal member.

When shifting the transverse strip, for example in order to decrease or increase the level of shading achieved by the shading device, the tilting safeguard can prevent the transverse strip from tilting between the first longitudinal member and second longitudinal member, which makes the transverse strip smooth-running, and easy to shift without any unnecessary resistance. This enables an easy activation of the shading system. As a result, the transverse strip can be guided parallel relative to the first longitudinal member and second longitudinal member not just on the faces pointing to the longitudinal members, but also between the first longitudinal member and second longitudinal member with the help of the tilting safeguard. Given enough clearance between the transverse strip and longitudinal members, this enables an easy shifting of the transverse strip without tilting. The tilting safeguard can preferably prevent or at least reduce a rotation by the transverse strip around in particular a vertical rotational axis running essentially perpendicular to the longitudinal members and to the cross member. It is especially preferred that the tilting safeguard be able to prevent or at least reduce a rotation by the transverse strip around an in particular horizontal rotational axis running essentially perpendicular to the longitudinal members and essentially parallel to the cross member. It is further preferred that the tilting safeguard be able to prevent or at least reduce a rotation by the transverse strip around an in particular horizontal rotational axis running essentially parallel to the longitudinal members and essentially perpendicular to the cross member. In particular, the tilting safeguard on the guide means can be moved along one or more contact points and/or contact surfaces given a movement by the transverse strip. The shading device is connected in particular with the holding frame and transverse strip, so that a shading element, for example the shading material of a roller blind, can be extended out of the shading device or retracted into the shading device by moving the transverse strip.

In particular, the at least one guide is passed through the transverse strip, proceeding from a first face of the transverse strip pointing to the first longitudinal member toward a second face pointing to the second longitudinal member, wherein the at least one guide is diverted into a first receiving area of the first longitudinal member by a first deflecting element provided on the first face, in particular by a pivoted deflection roller, and/or into a second receiving area of the second longitudinal member by a second deflection element provided on the second face, in particular by a pivoted deflection roller. As a result, the guide provided in particular with a flexible design can run into a partial region inside the longitudinal member, so that the guide is not visible from outside, and unable to collide with other movable parts, for example with parts of the shading device and/or with linear guiding elements, for example sliders, guided in the respective longitudinal member and connected with a face of the cross member. In particular, the guiding element can be secured at the height of one end of the first longitudinal member, and at the height of an end of the second guiding element pointing away from this end, and be guided through the cross member, between the first longitudinal member and second longitudinal member. In particular, the guiding element can assume an essentially zigzag progression with essentially rectangular deflections. It is especially preferred that two essentially mirror-inverted guide be provided.

The transverse strip preferably exhibits a movable actuating handle for shifting the transverse strip. The actuating handle is coupled with at least one braking element for decelerating the guiding element on the tilting safeguard, in particular over a flat surface. The actuating handle, once in an activated operating position, at least reduces a braking effect of the braking element. The braking element is pre-tensioned by a spring element for braking purposes, in particular when the actuating handle is in a non-activated normal position. Cross member movement that is undesirable to a vehicle passenger, in particular given a sudden change in acceleration, for example during an accident, can be prevented by the braking element as the result of friction between the tilting safeguard and guiding element, wherein a movement by the actuating handle relative to the remaining transverse strip makes it possible in particular to lift the braking effect, and allow the transverse strip to shift effortlessly.

It is especially preferred that the actuating handle be largely, in particular essentially completely, arranged in a recessed grip formed by the transverse strip. In particular the actuating handle is guided into the recessed grip in such a way that it can shift essentially parallel to the first longitudinal member and second longitudinal member. As a result, the actuating handle does not explode the contours of the cross member enveloping the recessed grip and jut into a passenger compartment of the motor vehicle, so that the actuating handle does not obstruct a rearward view through the rearview mirror of the motor vehicle.

In particular, the at least one guiding element is designed as a jacketed, in particular insert molded, guiding rope. In particular the guiding rope is flattened in an abutment region so as to flatly abut against the tilting safeguard. Given an imminent tilting of the transverse strip, the material used for the jacket and/or its geometric configuration allows the guiding element to exert enough of a counter-torque on the tilting safeguard to prevent tilting and force a parallel motion. The jacket is preferably encased only in the abutment region, so that the flattened jacket can abut against the tilting safeguard between the end positions of the transverse strip in longitudinal directions within the overall traveling distance of the transverse strip, and the guiding rope can be deflected outside the abutment region without a jacket in an easy and space-saving manner, for example using mounted deflection rollers.

The transverse strip preferably exhibits a lower shell and upper shell made out of different materials, in particular predominantly steel and predominantly aluminum. In particular the lower shell is joined with the upper shell through plastic deformation, in particular clinching or shearing/upsetting. The varying materials make it possible to easily optimize the cross member with respect to stiffness, natural resonance behavior and/or weight, wherein the varying materials can be readily joined together with the sandwich construction method. Additionally or alternatively, the upper shell can be joined with the lower shell via welding, adhesive bonding, screwing, riveting, snap-fitting, or the like.

It is especially preferred for at least one slider guided in the first longitudinal member or second longitudinal member to be connected with the transverse strip, preferably by clipping. As a result, the transverse strip can be easily connected with the at least one slider, wherein several sliders are preferably provided. In particular, the slider can exhibit a material differing from that of the cross member, making it possible to provide a suitable material pairing between the respective longitudinal member and slider, which enables a high resistance to wear at a low frictional resistance. Additionally or alternatively, the slider can be joined through adhesive bonding, screwing, riveting or the like.

In particular, a shading device equipped with a cross member and transverse strip and designed as a roller blind is provided. The roller blind exhibits a shading material for at least partially covering a window opening bordered by the holding frame and transverse strip. In particular the shading material is laterally lined to form a thickened area, and the lined thickened area is guided in a guiding slot of the first longitudinal member or second longitudinal member. In particular, the guiding slot exhibits a receiving slot pointing toward the window opening, whose height transverse to the direction in which the shading material moves is greater than the thickness of the shading material, but less than the thickness of the lined thickened area. As a result, the shading material can be threaded on a face of the respective longitudinal member in a longitudinal direction, and cannot exit the receiving slot transverse to the longitudinal direction when forces arise during operation, since the thickened area in this case pushes against the material bordering the receiving slot.

An embodiment relates to a motor vehicle encompassing a motor vehicle body. The motor vehicle body forms a roof opening, in particular one that transitions into a windshield area, and a shading system, which can be designed and further developed as described above. The motor vehicle body exhibits oblong holes running essentially transverse to the first longitudinal member and to the second longitudinal member for attaching the first longitudinal member and/or the second longitudinal member. This makes it easy to activate the shading system of the motor vehicle. The oblong holes can be used to easily connect the holding frame with the motor vehicle body, during which a precise parallel alignment of longitudinal members relative to each other can be taken into account during assembly. As a result, the transverse strip is prevented from tilting on longitudinal members that do not run parallel to each other.

An embodiment relates to a method for assembling a shading system, which can be designed and further developed as described above, with a motor vehicle body in which an assembly jig for keeping the first longitudinal member parallel to the second longitudinal member is joined with the first longitudinal member and second longitudinal member, after which the holding frame is connected with the motor vehicle body, whereupon the assembly jig is separated from the first longitudinal member and second longitudinal member. As a result, the holding frame can in particular have an essentially U-shaped configuration, so that the motor vehicle can be furnished with a panoramic window that can comprise both a windshield and a roof window for a roof opening. The assembly jig can be used to keep the ends of the longitudinal members pointing away from the cross member spaced a predefined distance apart, so that the longitudinal members can be mounted parallel to each other with a high level of precision, even if oblong holes running transverse to the longitudinal direction of the longitudinal members are provided for attaching the holding frame to the motor vehicle body. After the shading system has been assembled with the motor vehicle body, this ensures that the shading system of the motor vehicle can be easily activated.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
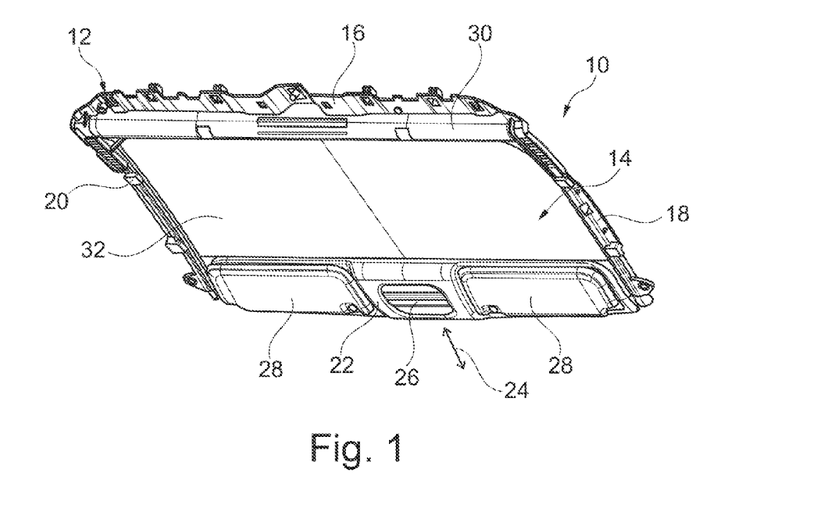
FIG. 1 is a schematic, perspective view of a shading system.

The shading system 10 depicted on FIG. 1 exhibits an essentially U-shaped holding frame 12, which borders a window opening 14. The holding frame 12 exhibits a cross member 16, with which a first longitudinal member 18 and second longitudinal member 20 are connected essentially at right angles, so that the first longitudinal member 18 and second longitudinal member 20 are essentially aligned parallel to each other. A transverse strip 22 is joined with the holding frame 12 so that it can shift in a longitudinal direction 24 running parallel to the longitudinal members 18, 20. The transverse strip 22 is unsupported between the longitudinal members 18, 20. The transverse strip 22 exhibits an actuating unit 26 for shifting the transverse strip 22. Furthermore, sun visors 28 are movably connected with the transverse strip. In the exemplary embodiment shown, the shading system 10 exhibits a shading device 30 configured as a roller blind, which is joined with the cross member 16 and, by way of a shading material 32 pre-tensioned in the longitudinal direction 24, with the transverse strip 22. Shifting the transverse strips 22 makes it possible to expose a portion of the window opening 14, for example to allow natural sunlight into the passenger compartment, or cover it with the shading material 32 as well as transverse strip 22, so as to at least partially shade the passenger compartment. The shading device 30 can alternatively also exhibit a window shade.

Figure 2:
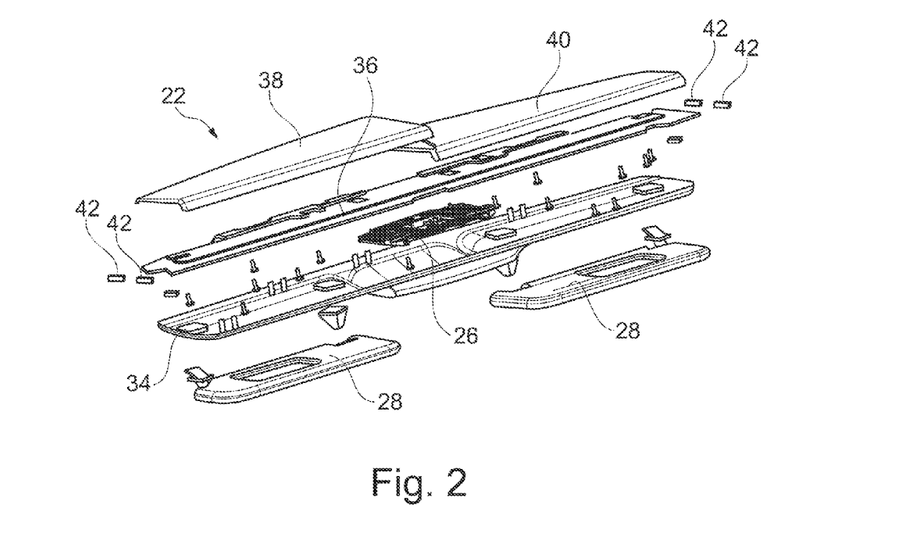
FIG. 2 is a schematic, exploded view of a transverse strip for the shading system from FIG. 1.

As depicted on FIG. 2, the transverse strip 22 manufactured based on the sandwich construction method can exhibit a lower shell 34 and an upper shell 36 joined with the lower shell 34 via clinching, between which the actuating unit 26 can be fixed in place. The lower shell 34 and upper shell 36 are made out of different materials. For example, the lower shell 34 can essentially consist of aluminum sheet, while the upper shell 36 can essentially be fabricated out of sheet steel, or vice versa. In the exemplary embodiment shown, the transverse strip 22 additionally exhibits a first cover 38 and a second cover 40, which each can be joined with the lower shell 34 and/or with the upper shell 36, preferably through clipping, so as to visually mask the interior of the transverse strip 22. The cross member 16 is further connected with sliders 42, via which the cross member 16 is linearly guided in the longitudinal members 18, 20. In the exemplary embodiment shown, the sliders 42 are clipped with the upper shell 36.

Figure 3:
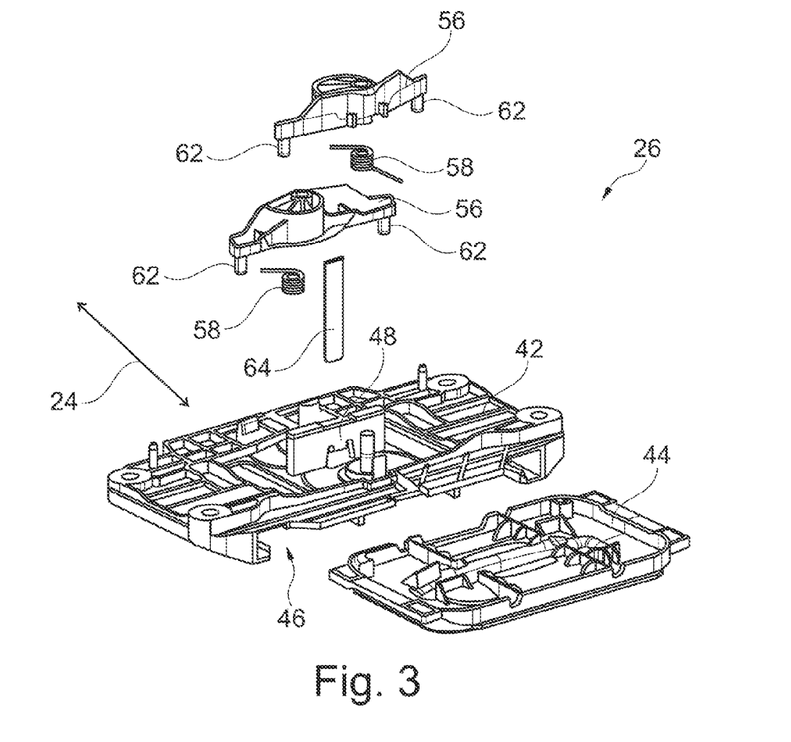
FIG. 3 is a schematic, exploded view of an actuating unit for the cross member from FIG. 2.
Figure 4:
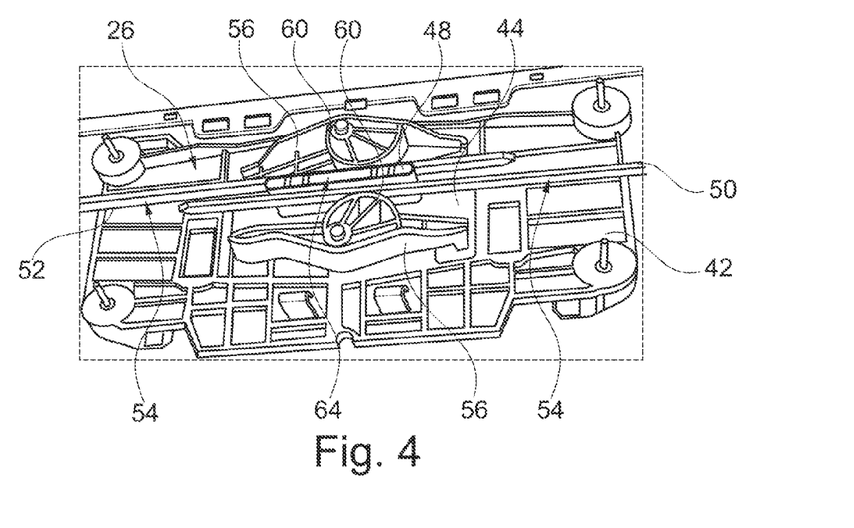
FIG. 4 is a schematic, perspective view of the actuating unit in the installed state.

As depicted on FIG. 3 and FIG. 4, the actuating unit 26 exhibits an actuating housing 42, which forms a recessed grip 46 for an actuating handle 44, into which the actuating handle 44 can be nearly completely sunk. In particular, the actuating handle 44 is accommodated so that it can shift in the longitudinal direction 24 with the actuating housing 42. The actuating housing 42 exhibits an essentially rib-shaped tilting safeguard aligned essentially transverse to the longitudinal direction, which in the exemplary embodiment depicted has flatly configured lateral surfaces pointing in the longitudinal direction 24 that can be made to flatly abut against a first guide 50 and a second guide 52. In the exemplary embodiment shown, the guide 50, 52 are designed as a guiding rope, a partial area of which is provided with a respective flat jacket 54. The flat abutment by the jackets 54 against the tilting safeguard 48 makes it possible to prevent the transverse strip 22 from tilting, so that the transverse strip 22 will not tilt in the longitudinal members 18, 20 while shifting the transverse strip 22.

In addition, two braking elements 56 are pivoted to the actuating housing 42, which are each pre-tensioned with a spring element 58 in such a way that, with the actuating handle 44 in a non-actuated, normal position, the jacket 54 of the respective guiding element 50, 52 is jammed between the braking element 56 and tilting safeguard 48. In this position, the transverse strip 22 is frictionally jammed with the guiding elements 50, 52, so that the transverse strip 22 is not shifted even given suddenly arising, strong acceleration forces. The jackets 54 of the guiding elements 50, 52 can each be pressed against the tilting safeguard 48 by a cam 60 formed by the respective braking element 56. In addition, the braking elements 56 exhibit actuating bolts 62 projecting from the actuating handle 44, against which the actuating handle 44 can strike in an activated operating position so as to turn the braking elements 56, thereby moving the cam 60 away from the tilting safeguard 48, and allowing the guiding elements 50, 52 to be moved past the tilting safeguard 48 while shifting the transverse strip 22. If the actuating handle 44 is released after the transverse strip 22 has shifted, the actuating handle 44 can be held in the normal position essentially without rattling with a return spring 64, for example in the form of a leaf spring, while the force exerted by the spring elements 58 again closes the braking elements 56, so that the transverse strip 22 can be smoothly locked in the current position. The actuating unit 26 can be used to intuitively shift the transverse strip 22 in both longitudinal directions 24 using just one hand.

Figure 5:
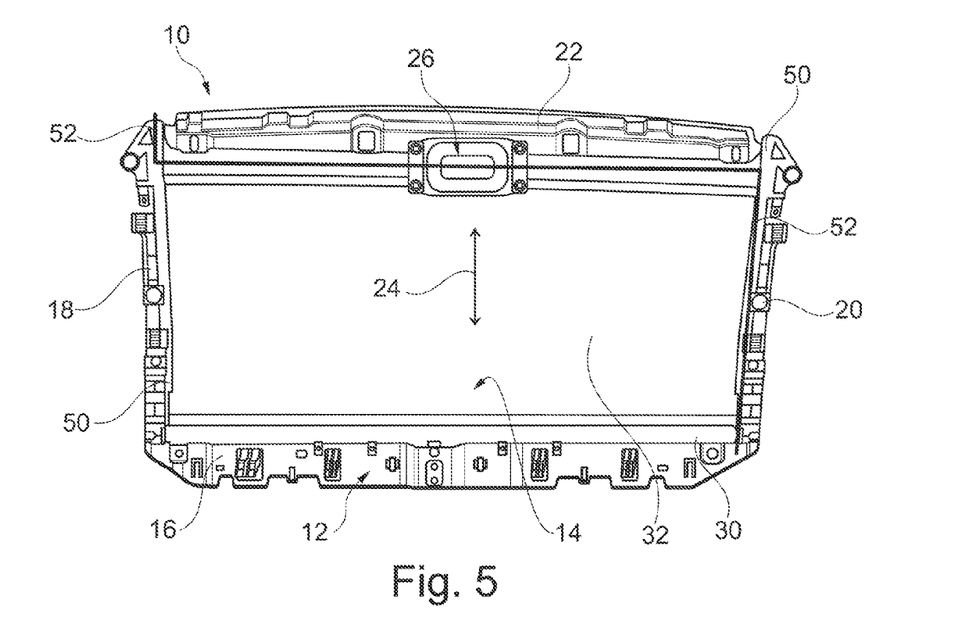
FIG. 5 is a schematic, partially open view of the shading system from FIG. 1.
Figure 6:
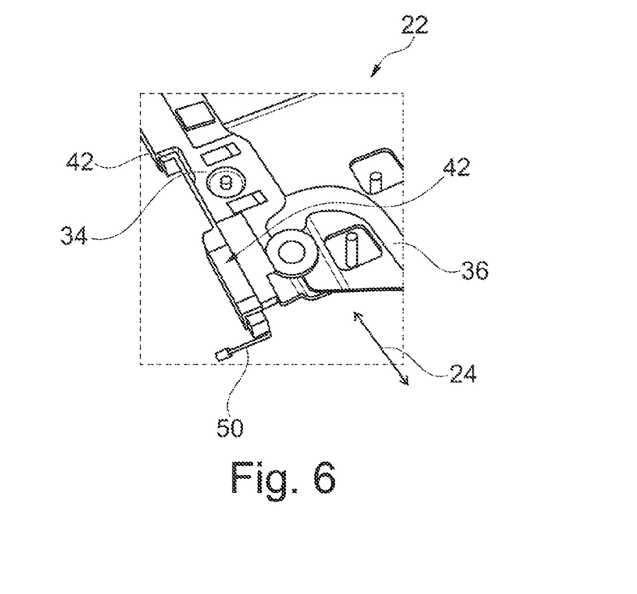
FIG. 6 is a schematic, detailed view of the transverse strip from FIG. 2.

As depicted on FIG. 5, for example, the first guide 50 can be fastened to an end of the second longitudinal member 20 pointing away from the cross member 16, run through the transverse strip 22 over the entire length of the transverse strip 22 transverse to the longitudinal direction 24, and be connected with the first longitudinal member 18 and/or the cross member 16 at the end of the first longitudinal member 18 pointing toward the cross member 16. Accordingly, the second guide 52 can be fastened to an end of the first longitudinal member 18 pointing away from the cross member 16, run through the transverse strip 22 over the entire length of the strip 22 transverse to the longitudinal direction 24, and be connected with the second longitudinal member 20 and/or the cross member 16 at the end of the second longitudinal member 20 pointing toward the cross member 16. As a result, the guide 50, 52 can be concealed in the longitudinal members 18, 20 and transverse strip 22 in a protected position. As depicted on FIG. 6, the respective guide 50, 52 can be guided between the transverse strip 22 and the sliders 42 clipped with the transverse strip 22 in a longitudinal direction 24, for example through a U-shaped receiving area of the longitudinal member 18, 20.

Figure 7:
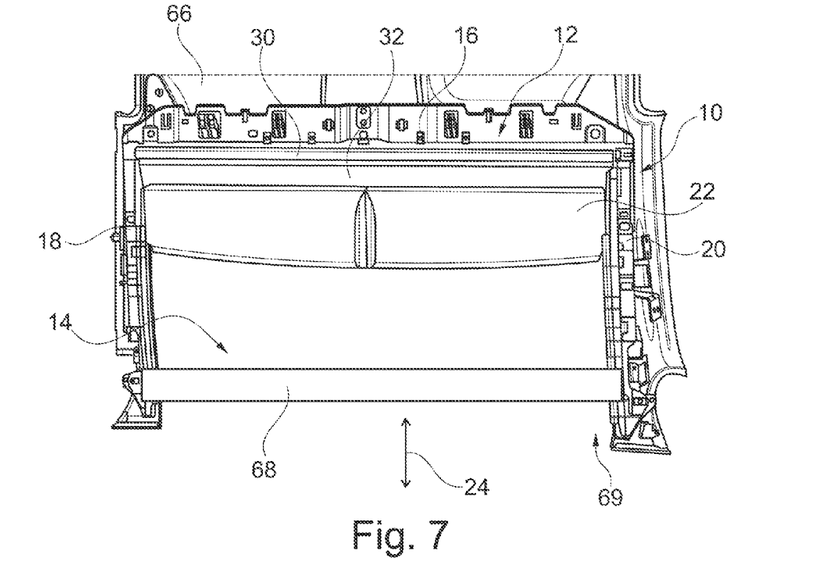
FIG. 7 is a schematic, top view of the shading system from FIG. 1 in a preassembled state.

As depicted on FIG. 7, the transverse strip 22 can be positioned in comparatively close proximity to the cross member 16 while assembling the shading system 10 with a motor vehicle body 66 of a motor vehicle. An assembly jig 68 is fastened to the ends of the longitudinal members 18, 20 pointing away from the cross member 16 in the longitudinal direction 24 opposite the cross member 16. The length of the assembly jig 68 is selected in such a way as to maintain the parallelism of the longitudinal members 18, 20, even at the forces that arise during assembly. In particular, the assembly jig exhibits centering pins, so that the shading system 10 can additionally be correctly aligned relative to the motor vehicle body 66 in a roof opening 69 formed by the motor vehicle body 66. Even given a changing vehicle width of the motor vehicle body 66, this makes it possible to ensure a simple and rapid assembly with mutually parallel longitudinal members 18, 20. After the holding frame 12 has been completely fastened with the motor vehicle body 66, the assembly jig 68 can be removed from the essentially U-shaped holding frame 12 in the longitudinal direction, so that the transverse strip 22 can be shifted into its position spaced a maximum distance apart from the cross member 16.

Figure 8:
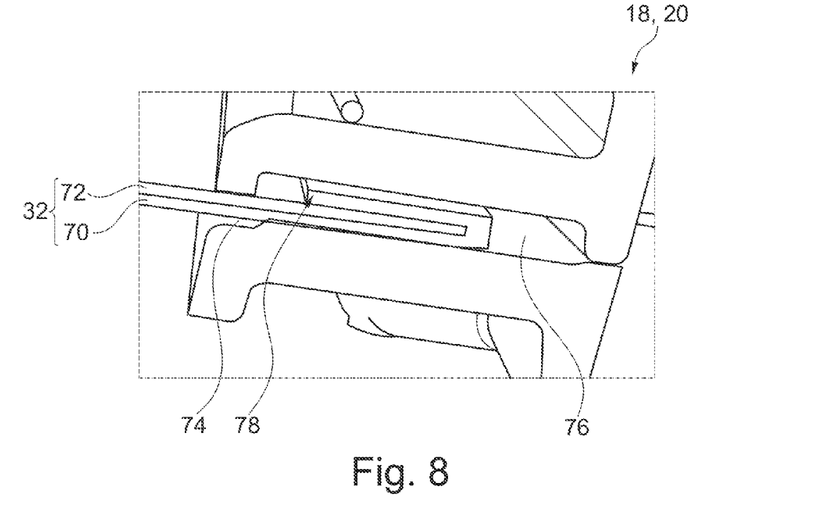
FIG. 8 is a schematic, detailed view of a longitudinal member for the shading system from FIG. 1.

As depicted on FIG. 8, the shading material 32 can be composed of several layers. In the exemplary embodiment shown, the shading material 32 exhibits an underlay 70, for example which has a bright hue that matches the roof liner of the motor vehicle, and an overlay 72, for example which has a dark hue that matches the outside paint of the motor vehicle body 66. For example, the underlay 70 is designed as a thicker material clad with an overlay 72 designed as a thin film. The shading material 32 projects laterally over a receiving slot 74 into a guiding slot 76 of the respective longitudinal member 18, 20. Inside the guiding slot 76, the receiving material 32 is lined to produce a thickened area 78. Given tensile forces inwardly directed into the window opening 14, the lined thickened area 78 can strike against the material of the longitudinal member 18, 20 bordering the receiving slot 74, so that the shading material 32 cannot slip out of the longitudinal members 18, 20. The thickened area 78 can be generated by a welded seam. It is possible to line several layers or even just one portion, for example just a single layer. For example, only the underlay 70 is lined, so that the overlay 70 ends laterally in a pocket formed by the lining.

Figure 9:
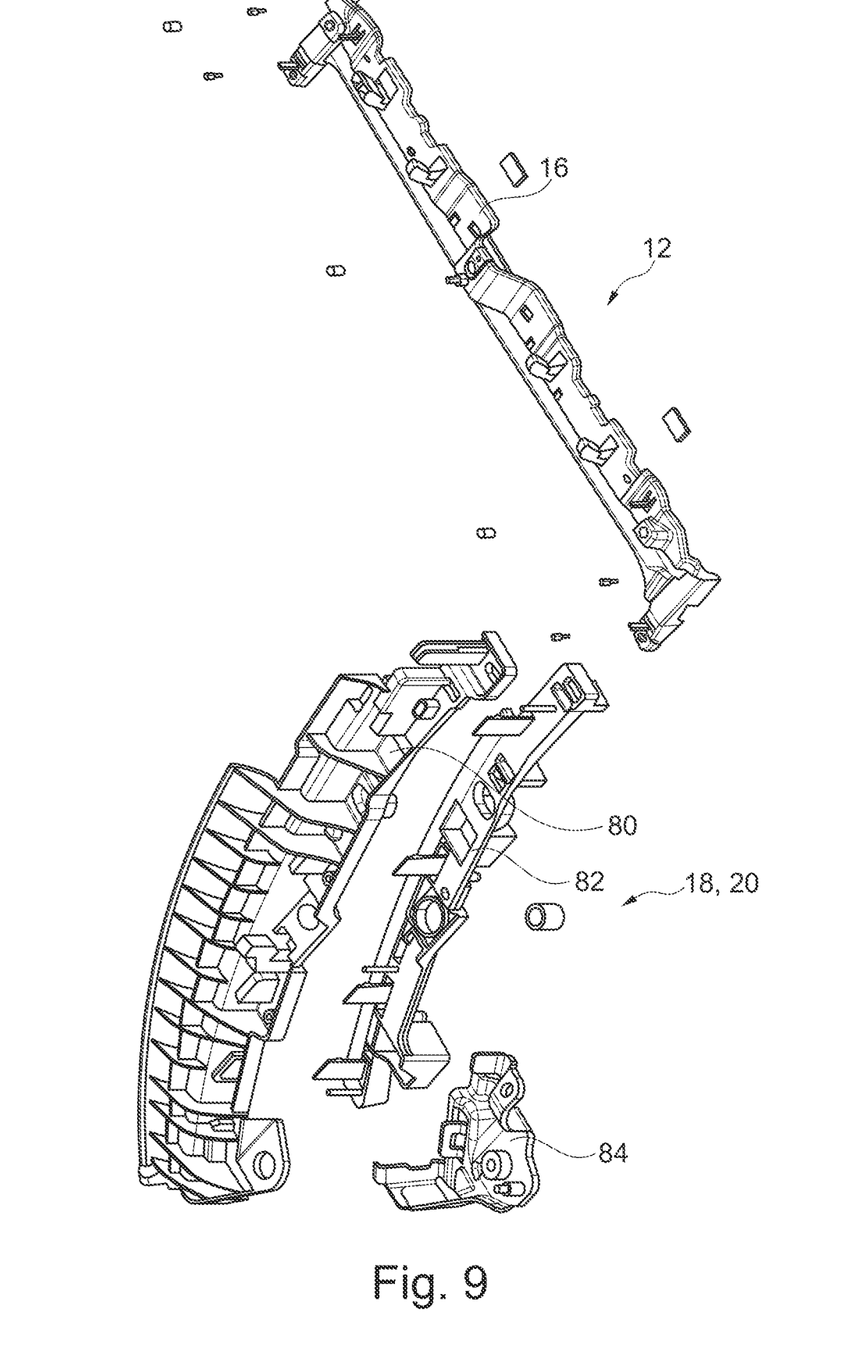
FIG. 9 is a schematic, exploded view of part of a holding frame for the shading system from FIG. 1.

As depicted on FIG. 9, the respective longitudinal member 18, 20 can exhibit an upper section 80 and a lower section 82 separate from the upper section 80, which can be connected with each other, for example so as to yield the receiving slot 74 for the shading material 32 between the upper section 80 and lower section 82, and/or a linear slide for the sliders 42 connected with the transverse strip 22 in a receiving area. In particular, the upper section 80 and/or lower section 82 can be joined with an absorption unit 84 as a kind of crash box, so that the forces arising in case of an accident can be absorbed via the plastic deformation of parts of the absorption unit 84, without having to tolerate any unnecessary plastic deformations of the holding frame 12 or other components of the shading system 10. This makes it possible to keep down the repair costs incurred in the event of an accident.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A shading system for a panoramic window of a motor vehicle, comprising:
   a holding frame configured for attachment to a motor vehicle body, the holding frame comprising:
   a cross member;
   a first longitudinal member joined with the cross member; and
   a second longitudinal member joined with the cross member;
   a transverse strip that is configured to slide from the first longitudinal member and the second longitudinal member in order to activate a shading device coupled with the cross member and the transverse strip for at least partially covering a window opening bordered by the holding frame and the transverse strip; and
   a guide connected with the holding frame,
   wherein the transverse strip comprising a tilting safeguard that is configured to prop against the guide so as to guide the transverse strip parallel relative to the first longitudinal member and the second longitudinal member.

2. The shading system according to claim 1, wherein the shading device is a roller blind.

3. The shading system according to claim 1, wherein the shading device is a window shade.

4. The shading system according to claim 1, wherein the guide is a guiding rope.

5. The shading system according to claim 1, wherein the shading system is an overhead shading system for the panoramic window of the motor vehicle.

6. The shading system according to claim 1,
   wherein the guide is passed through the transverse strip, proceeding from a first face of the transverse strip pointing to the first longitudinal member toward a second face pointing to the second longitudinal member,
   wherein the guide is diverted into a first receiving area of the first longitudinal member by a first deflecting element provided on the first face.

7. The shading system according to claim 1,
   wherein the guide is passed through the transverse strip, proceeding from a first face of the transverse strip pointing to the first longitudinal member toward a second face pointing to the second longitudinal member,
   wherein the guide is diverted into a first receiving area of the first longitudinal member by a first deflecting element provided on the first face and into a second receiving area of the second longitudinal member by a second deflection element provided on the second face.

8. The shading system according to claim 1,
   wherein the transverse strip comprises a movable actuating handle for shifting the transverse strip,
   wherein the movable actuating handle is coupled with a braking element that is configured to decelerate the guide on the tilting safeguard,
   wherein the movable actuating handle, once in an activated operating position, at least reduces a braking effect of the braking element,
   wherein the braking element is pre-tensioned by a spring element for braking purposes.

9. The shading system according to claim 8,
   wherein the movable actuating handle is largely arranged in a recessed grip formed by the transverse strip,
   wherein the movable actuating handle is guided into the recessed grip for shifting essentially parallel to the first longitudinal member and the second longitudinal member.

10. The shading system according to claim 4,
    wherein the guide is configured as a jacketed guiding rope, and
    wherein the guiding rope is flattened in an abutment region so as to flatly abut against the tilting safeguard.

11. The shading system according to claim 10, wherein the jacketed guiding rope is an insert molded jacketed guiding rope.

12. The shading system according to claim 1,
    wherein the transverse strip comprises a lower shell and an upper shell are substantially comprised out of different materials, in particular predominantly steel and predominantly aluminum,
    wherein the lower shell is joined with the upper shell through plastic deformation, in particular clinching or shearing/upsetting.

13. The shading system according to claim 12, wherein the lower shell is substantially comprised of steel.

14. The shading system according to claim 12, wherein the upper shell is substantially comprised predominantly aluminum.

15. The shading system according to claim 1, further comprising a slider guided in the first longitudinal member and connected with the transverse strip.

16. The shading system according to claim 1, further comprising a slider guided in the second longitudinal member and connected with the transverse strip.

17. The shading system according to claim 1, further comprising the shading device equipped with the cross member and the transverse strip and configured as a roller blind,
   wherein the roller blind comprising a shading material for at least partially covering the window opening bordered by the holding frame and the transverse strip,
   wherein the shading material is laterally lined to form a thickened area and the thickened area is guided in a guiding slot of the first longitudinal member.

18. A motor vehicle, comprising:
   a motor vehicle body forming a roof opening; and
   a shading system comprising:
   a holding frame configured for attachment to the motor vehicle body, the holding frame comprising:
      a cross member;
      a first longitudinal member joined with the cross member; and
      a second longitudinal member joined with the cross member;
   a transverse strip that is configured to slide from the first longitudinal member and the second longitudinal member in order to activate a shading device coupled with the cross member and the transverse strip for at least partially covering a window opening bordered by the holding frame and the transverse strip; and
   a guide connected with the holding frame,
   wherein the transverse strip comprises a tilting safeguard that is configured to prop against the guide so as to guide the transverse strip parallel relative to the first longitudinal member and the second longitudinal member.

* * * * *